United States Patent
Martin

(10) Patent No.: US 7,481,171 B2
(45) Date of Patent: Jan. 27, 2009

(54) SINGLE DISC LIQUID FERTILIZER OPENER

(76) Inventor: Howard D Martin, 169 Allegre Rd., Elkton, KY (US) 42220

( * ) Notice: Subject to any disclaimer, the term of this patent is extended or adjusted under 35 U.S.C. 154(b) by 437 days.

(21) Appl. No.: 11/215,718

(22) Filed: Aug. 30, 2005

(65) Prior Publication Data

US 2007/0044694 A1  Mar. 1, 2007

(51) Int. Cl.
*A01C 23/00* (2006.01)
(52) U.S. Cl. .................................................. 111/121
(58) Field of Classification Search .......... 111/118–129
See application file for complete search history.

(56) References Cited

U.S. PATENT DOCUMENTS

| | | | |
|---|---|---|---|
| 2,920,587 | A | 1/1960 | Shriver |
| 4,244,306 | A | 1/1981 | Peterson |
| 4,760,806 | A | 8/1988 | Bigbee |
| 4,796,550 | A | 1/1989 | Van Natta |
| 4,987,841 | A | 1/1991 | Rawson |
| 5,626,196 | A | 5/1997 | Hughes |
| 5,640,914 | A | 6/1997 | Rawson |
| 5,787,994 | A | 8/1998 | Friesen |
| 6,024,179 | A | 2/2000 | Bourgault |
| 6,237,696 | B1 | 5/2001 | Mayerle |
| 6,260,632 | B1 | 7/2001 | Bourgault |
| 6,347,594 | B1 | 2/2002 | Wendling |
| 6,644,224 | B1 | 11/2003 | Bassett |
| 6,698,528 | B2 | 3/2004 | Best |
| 6,912,963 | B2 | 7/2005 | Bassett |
| 2004/0149465 | A1 | 8/2004 | Butterfield |
| 2005/0051068 | A1 | 3/2005 | Swanson |

OTHER PUBLICATIONS

Acra-Place, Inc.; Product Catalog, Aug. 2005, pp. 18-20; USA (describing/illustrating parts found in U.S. Patent #5,787,994—no expired).

*Primary Examiner*—Christopher J. Novosad
(74) *Attorney, Agent, or Firm*—Hamilton IP Law, PC; Jay R. Hamilton; Charles A. Damschen

(57) ABSTRACT

A method and apparatus to be mounted upon a planter row unit for delivering liquid fertilizer to the bottom of a trench without contacting the seed to be planted is disclosed and claimed. The system as claimed and described is adapted for mounting to substantially all modern row units employing floating row units. The method and apparatus as described does not interfere with existing down pressure or seed placement systems as found on modern row crop planters. As described and implemented, the method and apparatus is more compact and lighter in weight than the prior art. The attached assembly for a seed planting unit works in combination with a seed trench opener to form a trench for the deposit of liquid fertilizer offset from and parallel to the later formed seed trench. The apparatus allows directed liquid fertilizer delivery in close proximity to the seed trench with minimal disruption of said seed trench. The attachment includes a single disk blade disposed forward of the seed trench forming unit. The single disk blade is disposed at an angle of four degrees or less from the line defining the direction of travel of the seed planting implement in combination with a furrow strap. The attachment includes a selectively adjustable down force structure and a selectively adjustable depth control mechanism.

33 Claims, 15 Drawing Sheets

SINGLE DISC LIQUID FERTILIZER OPENER

STATEMENT REGARDING FEDERALLY SPONSORED RESEARCH OR DEVELOPMENT

No federal funds were used to develop or create the invention disclosed and described in the patent application.

CROSS REFERENCE TO RELATED APPLICATIONS (Not applicable)
None

FIELD OF THE INVENTION

The apparatus and method described herein are generally applicable to the field of agricultural equipment. The embodiments shown and described herein are more particularly for improved delivery of liquid fertilizer as used with seed planter row units.

REFERENCE TO SEQUENCE LISTING, A TABLE, OR A COMPUTER PROGRAM LISTING COMPACT DISK APPENDIX

Not Applicable

BACKGROUND OF THE INVENTION

The invention as described herein is for attachment to a planter row unit to be used in minimum or no-till conditions. Over the past forty years there has been a migration in agriculture from full tillage prior to planting to no or minimum tilled planting. Full tillage operations may have included multiple passes and resulted in a soil surface having a relatively smooth, soft and uniform composition. The tilled seedbed offered a uniformly inviting environment for introduction of fertilizer. By contrast, the field and soil conditions offered by the typical no-till or minimum till environment are inhospitable. The surface cover and soil conditions are typically non-uniform. The field residue, although substantially decomposed, presents ample opportunities for plugging, wadding and or repelling of a disc, coulter or knife inserted therein. Farmers face the challenges presented by adoption of no-till and minimum till practices now out of necessity versus choice as required by the ever competitive agricultural environment.

Since the introduction of the modern planter row unit, many changes have taken place within agriculture as a result of both internal and external forces. Genetic, chemical and fertilization technologies have increased yields while globalization has increased competition to produce more bushels at less cost. Another important force in the market has been consolidation of operations and growth of farming operations. Farming operations now may cover thousands and tens of thousands of acres, acreages not possible or thought plausible twenty to thirty years ago. This consolidation has fueled intense competition to reduce operating costs and maximize equipment utilization rates to increase profitability. As a result operators are pulling larger row crop planters, driving faster across the field during planting and reducing the trips to and across the field. The drive to reduce the trips across the field has spurned interest in both low and no-tillage planting operations. These practices are also sought because fewer passes over a field require less input cost. Additionally, due to reduced margins and larger equipment, fewer farmers are farming more acres of ground. This has produced the impetus to increase planting speed up to 6-7 miles per hour.

Environmental laws and regulations passed since the initial introduction of the modern planter row unit governing water run-off and soil erosion require implementation of low-till or minimum till practices. Further operational changes are also driven by the impact of government price supports and payments. Compliance with environmental laws and regulations is required for enrollment in most government programs and payments may be contingent on compliance with modern soil conservation techniques.

What has not changed, however, is the length of the seasons and the importance of field conditions to the resultant crop planted. Per region, there are typically only so many days best suited for planting crops. Furthermore, planting in sub-optimum conditions still increases the potential for a poor result and reduced crop yields. Now then, more than ever, farm operators have an incentive to reduce costs and comply with the standards of government programs through adoption of one-pass or one-trip technologies. Minimal disruption of the soil is preferred for both compliance reasons and economics i.e. one-trip planting requires less fuel and labor expense. These factors have changed the environment and requirements for the modem planter row unit. The field and market environment today therefore, requires planter attachments that can handle increased variations in the soil and field conditions.

A compliment to one-pass planting methods is the introduction of fertilizer at the time of planting. This practice is supported by agricultural research indicating a small amount of fertilizer concurrent with the introduction of seed and in relative proximity to the seed, provides the emerging plant with a boost or jumpstart. Although either liquid or dry fertilizer can be used to provide this "jumpstart", many users have migrated to liquid because it absorbs into the soil better and is easier to handle. Directed placement of fertilizer (also known as "starter" or "jumpstarter" fertilizer) in close spatial relationship to seed at the time of planting is therefore beneficial to the plant. The benefits of this practice are supported by ample trials and evidence suggesting improved plant growth characteristics and ultimately improved yields. To achieve the desired benefits of starter fertilizer requires attainment of the following objectives:

1. Proper fertilizer placement in the soil;
2. Proper fertilizer placement in relation to the seed as the seed is placed in the soil; and,
3. Segregation of the seed and fertilizer as placed in the soil.

The resulting detrimental effects of not achieving the above objectives are understood by those practiced in the arts. Placing the fertilizer on top of the soil reduces the value of the fertilizer to the seed and exposes the fertilizer to wind or water erosion. Placing the fertilizer too far from the seed, either vertically or horizontally, reduces the seed's access to the fertilizer, thereby reducing the effectiveness of the fertilizer. It is also advantageous to minimize the contact of the liquid fertilizer with the planting equipment. Liquid fertilizer is known to degrade both paint and metal surfaces potentially decreasing equipment operational run times. The corrosive nature of the liquid fertilizer also increases operator difficulties in working on equipment exposed to said fertilizer. Direct placement of corrosive liquid fertilizer upon the seed can degrade and or destroy the planted seed.

The prior art, however, has failed to enable an apparatus or method of starter fertilizer placement which accomplishes the above objectives. A review and examination of the prior art highlights the weaknesses of the prior art to enable liquid fertilizer delivery in close proximity to a seed trench. As result, the solutions available in the prior art are inadequate.

Prior Art Review

U.S. Pat. Nos. 6,912,963 and 6,644,224 issued to Bassett both disclose single disc fertilizer opener mounted to a row unit. Both patents fail to teach a method or apparatus for directed placement of liquid fertilizer and incorporated within the soil therein. Furthermore, Bassett is silent on the necessity of maintaining soil between the placed fertilizer and seed. U.S. Pat. No. 6,347,594 issued to Wendling teaches a single disc seed opener in combination with a closing wheel. To respond to changes in soil elevation and conditions, Wendling requires mounting the assembly on the planter frame and for the disc opener to be spring loaded. Furthermore, angle of the disc blade is to be angled at approximately five (5) degrees from the direction of travel. As deployed, under Wendling, all units are mounted at the same angle to the direction of travel. This mounting method results in high side loading forces at the point of attachment for each unit. Placement of fertilizer using the seed tube as taught by Wendling would result in splashing fertilizer on the disc and potentially the seed. U.S. Pat. No. 4,760,806 issued to Bigbee teaches another frame mounted single disc in combination with a seed tube. See also U.S. Pat. No. 5,640,914 issued to Rawson; U.S. Pat. No. 5,626,196 issued to Hughes; and U.S. Pat. No. 4,987,841 issued to Rawson provide other examples of frame mounted single disc openers. U.S. Pat. No. 5,787,994 issued to Frieson discloses a single disc opener mounted to the parallel linkage of a row unit. The angle of the single disc as taught by Frieson is four degrees from the planter direction of travel; the fertilizer placement tube as mounted moves in the same direction as the planter direction of travel. The disc is coultered or tined as taught by Friesen and the fertilizer feed tube is mounted to an upright mounted groove forming shank. A spring is disclosed to bias the shank against the disc having a coulter or tine. No mechanism is disclosed to bias the shank against the furrow to hold the shank in the furrow. No mechanism is disclosed to move the fertilizer feed tube discharge outlet in combination with the opener assembly. Finally, U.S. Pat. Nos. 6,260,632 and 6,024,179 issued to Bourgault discloses a floating disc opener contacting an inner side of the disc blade. As disclosed the assembly does not extend to or past the outer perimeter of the disc. The fertilizer tube as taught by Bourgault does not extend into the furrow created by the disc.

The above prior art alone or in combination fails to teach a planter row unit mounted attachment for directed delivery and incorporation of liquid fertilizer in no or minimum till conditions which is compact and light in weight. The prior art fails to teach an apparatus that minimizes interference with seed placement while minimizing soil disruption for placement of said fertilizer. The prior art fails to teach a liquid fertilizer opener that creates minimal side loading using a symmetrical but opposite mounting structure.

As disclosed and claimed, the discs are angled and work in combination with a furrow control strap which is mounted to the outer edge of the disc. As configured, the furrow control strap always faces to the outside of the planter row units. For example, when mounted on the left side planter row units, the furrow control strap will be on the left side of the assembly with the fertilizer feed shoe on the right. Conversely, on the right hand side planter row units, the furrow control strap will be on the right side of the assembly with the fertilizer feed shoe on the left.

The outer edge of the single disc blade is flat and the inner portion is beveled. The beveled edge of the disc cuts the furrow for insertion of the spring loaded fertilizer feed tube shoe within the furrow. The spring loaded fertilizer feed tube shoe is pre-loaded during assembly so that the fertilizer feed tube shoe is biased both to the bottom of the furrow and against the interior of the disc. The lower front portion of the fertilizer feed tube shoe rests against the lower aft portion of the fertilizer feed tube pocket. This allows the fertilizer feed tube shoe to maintain its substantially horizontal orientation but pivot upward in the event of an over load condition i.e. contact with a stone or clod, thereby preventing catastrophic failure. The upper portion of the fertilizer feed tube pocket serves to strengthen the disc hub support beam against side loading forces. The fertilizer feed tube protective pocket also reduces contact between the fertilizer feed tube

SUMMARY OF THE INVENTION

The row unit mounted single disc liquid fertilizer opener described and claimed herein is mounted upon a planter row unit to minimize impact and disruption of the seed furrow while delivering liquid fertilizer to a separate and segregated fertilizer furrow for no-till or minimum tillage operations. The single disc fertilizer opener is preferably mounted in combination with a row cleaner but is not necessary for enablement. The single disc is angled less than five degrees from the direction of travel. In the preferred embodiment, the single disc liquid fertilizer opener assemblies for the left and right planter row units are a mirror image of each other but have opposite angles i.e. the left and right side units are not interchangeable. In this configuration, soil is moved by the disc from the inside of the row to the outside, thus minimizing interference with the seed trench. This configuration also equalizes the side loading when an equal number of units are mounted on each side of the planter frame.

The disc assembly is mounted upon a disc axle using tapered bearings. Adjustment and maintenance of the disc assembly has been improved by inclusion of an interlocking axle and step washer to allow tightening the tapered bearings without removal of a cotter or tapered pin which are prone to failure and or corrosion. assembly and undesirable materials. The front interior edge of fertilizer feed tube protective pocket is in close proximity to the disc and acts as a scraper.

The spring loaded fertilizer feed shoe has a generally low profile to minimize soil disruption with a length that is substantially greater than its width and height. The fertilizer feed shoe has both an active inner and outer surface. The inner surface is substantially flat and is biased against the disc to act as a disc scraper. The fertilizer feed tube shoe furrow control edge forms the outer surface of the fertilizer feed tube shoe and has an arcuate surface with a decreasing radius which ends as a straight edge providing the fertilizer feed tube shoe with a knife like edge to engage the lower inside portion of the furrow. The edge is substantially horizontal during soil engagement. Fertilizer feed shoe soil engagement tip forms the outer portion of the fertilizer feed tube shoe furrow control edge extending past the periphery of the disc. The inner portion facing the disc is substantially flat. The outer portion also forms a knife like edge having a decreasing arcuate radius along its length and ending as a u-shape at the outer most engagement tip. During operation, the disc and fertilizer feed tube shoe furrow control edge in combination produce a u-shaped furrow having a bottom width substantially equivalent to its top width. The combination of decreasing radii along the fertilizer feed shoe soil engagement tip and fertilizer feed tube shoe furrow control edge hold the furrow created by the disc open and shape the furrow to allow even discharge and distribution of the liquid fertilizer therein at the fertilizer feed shoe soil engagement tip with a minimum of soil disruption.

The furrow control strap mounted against the flat side of the disc serves to minimize build-up on the outside of the disc and aids in minimizing disruption of the soil surrounding the fertilizer furrow. The combination of minimal seed furrow disruption and segregation of the seed and fertilizer furrows provides desired depth and spatial placement of liquid starter fertilizer during planting operations. The disc assembly may be adjusted to increase or decrease the depth of fertilizer placement. The disc assembly may be set to place the fertilizer furrow within one, two and three inches of the seed furrow. The depth of the furrow control strap may also be adjusted.

The single disk liquid fertilizer opener as disclosed and claimed is mounted on the planter row unit. Mounting upon the row unit allows each disk opener to respond in parallel with the individual soil and field conditions encountered by each individual row unit as the planter is pulled across the field. Mounting to the row unit improves performance by increasing responsiveness. Furthermore, mounting allows elimination of complex spring systems which add bulk, weight and complexity thereby reducing performance. In the preferred embodiment, the single disc blade has a diameter of fourteen inches allowing close mounting to the other row unit components. The single disc blade is also substantially vertical; this orientation reduces the mounted width of the assembly, allowing mounting on the planter row unit face plate. As built and mounted, the entire assembly weighs thirty-six pounds. By comparison, the assemblies of the prior art weigh between seventy and ninety pounds. This additional weight is unnecessary and only promotes sidewall compaction in certain conditions where reduction in row unit down pressure is desired.

The single disk liquid fertilizer opener disclosed may be applied to all agricultural planters. Attaching to existing planter equipment is justified because the unit is simple to install, easily grasped by those in the field and reliable. As shown by research and practice, liquid fertilizer may increase yields by 5-10% through improved seed access to necessary fertilizer components. Therefore, a compact single disc fertilizer opener is desirable to increase use and application of liquid starter fertilizer at the time of planting in no-till and minimum till conditions. It is therefore an objective of the method and apparatus disclosed to open a small fertilizer trench before the seed trench and offset to said seed trench for directed delivery of liquid fertilizer at the bottom of the fertilizer trench prior to insertion of the seed in the furrow.

It is another objective of the method and apparatus disclosed to minimize creation of sidewall compaction of the v-groove seed trench formed by the row unit for planting of the seed.

It is another objective of the method and apparatus disclosed to maintain an uniform distance between the fertilizer furrow and the seed furrow.

It is another objective of the method and apparatus disclosed to minimize contact between the disc assembly and the seed trench.

It is another objective of the method and apparatus disclosed to shield the fertilizer feed tube to minimize opportunities for fertilizer feed tube failure due to impact with field stubble, clods and stones.

It is another objective of the method and apparatus disclosed to eliminate premature mechanical failure of the system by allowing improved access and maintenance.

Figure 1:
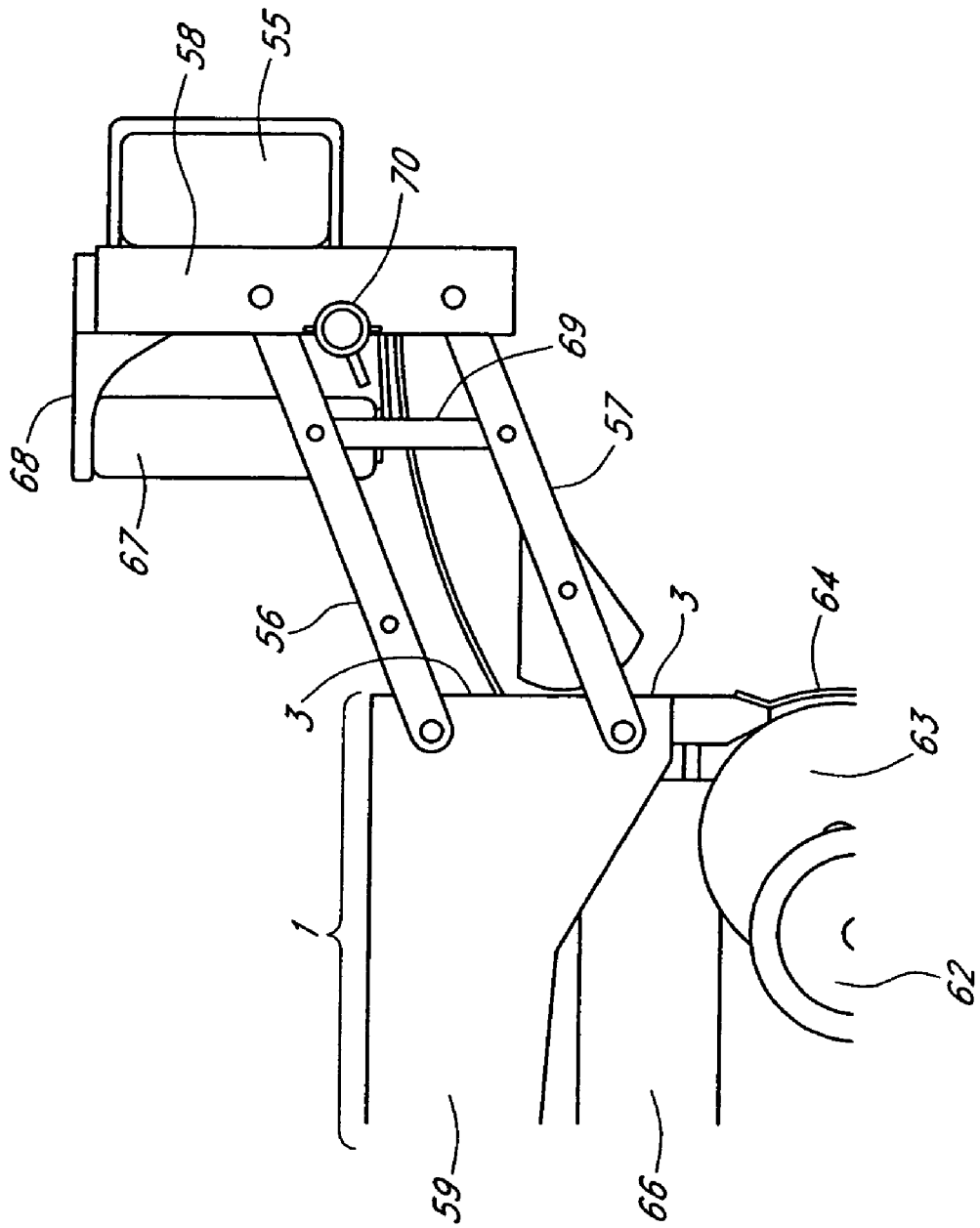
FIG. 1 provides a side perspective view of a planter row unit as found in the prior art.

| DETAILED DESCRIPTION - LISTING OF ELEMENTS | |
| --- | --- |
| Element Description | Element Number |
| Planter Row Unit | 1 |
| Row Unit Parallel link | 2 |
| Planter Row Unit Front Face Plate | 3 |
| Row Unit Mounting Bracket plate | 4 |
| Row Unit Mounting Bracket plate bolts | 5 |
| Row Unit Mounting Bracket plate bolt holes | 6 |
| Mounting bracket support beam side plate | 7 |
| Mounting bracket support beam side plate bolt holes | 8 |
| Support beam adjustment shim | 9 |
| Disc | 10 |
| Disc beveled edge | 11 |
| Disc hub support beam | 12 |
| Double-threaded end disc axle | 13 |
| Support beam attachment bolts | 14 |
| Furrow strap bracket support nut | 15 |
| Furrow strap side axle washer | 16 |
| Step washer | 17 |
| Disc axle support tube | 18 |
| Disc axle support tube support weld | 19 |
| Support beam attachment nuts | 20 |
| Washer | 21 |
| Support beam bolt holes | 22 |
| Furrow strap depth adjustment lever | 23 |
| Furrow strap depth adjustment lever setting bolt | 24 |
| Disc hub | 25 |
| Disc hub bearing grease zirk | 26 |
| Disc hub mounting bolts | 27 |
| Disc hub tapered bearing | 28 |
| Disc axle strap keyed and threaded end | 29 |
| Furrow strap | 30 |
| Furrow strap mounting bracket | 31 |
| Furrow strap mounting bracket lock slot | 32 |
| Furrow strap stiffener | 34 |

-continued

DETAILED DESCRIPTION - LISTING OF ELEMENTS

| Element Description | Element Number |
| --- | --- |
| Furrow strap adjustment holes | 35 |
| Furrow strap elastic insert | 36 |
| Fertilizer feed tube inlet | 37 |
| Furrow strap mounting bolts | 38 |
| Furrow strap mounting nuts | 39 |
| Fertilizer feed tube shoe | 40 |
| Fertilizer feed tube | 41 |
| Fertilizer feed shoe soil engagement tip | 42 |
| Disc axle bearing wear adjustment nut | 43 |
| Fertilizer feed tube shoe cantilever end | 44 |
| Fertilizer feed tube shoe furrow control edge | 45 |
| Fertilizer feed shoe spring engagement slot | 46 |
| Fertilizer feed shoe spring | 47 |
| Fertilizer feed tube pocket | 48 |
| Fertilizer feed tube discharge end | 49 |
| Disc axle strap depth control lock slot | 50 |
| Disc axle strap depth control keyed and threaded end | 51 |
| Fertilizer feed tube shoe spring anti-rotation end | 52 |
| Step washer groove | 53 |
| Fertilizer feed shoe spring fixation nut | 54 |
| Planter mainframe | 55 |
| Upper parallel link | 56 |
| Lower parallel link | 57 |
| Center mount of the row unit frame | 58 |
| Row unit seed hopper frame | 59 |
| Row Unit Cleaner | 60 |
| Intentionally blank | 61 |
| Gauge Wheels | 62 |
| Vee opener blades | 63 |
| Guard for opener blades | 64 |
| Row Cleaner Unit Trash Wheel | 65 |
| Center Shank of Row Unit | 66 |
| Air Bag | 67 |
| Upper Support - Down Pressure Spring | 68 |
| Lower Arm Assembly - Down Pressure Spring | 69 |
| Main Drive Shaft | 70 |
| Flexible Drive Shaft - Row Unit | 71 |
| Seed hopper | 72 |
| Row Cleaner Unit Mounting assembly | 73 |
| Closing wheels | 74 |
| Single disc liquid fertilizer opener assembly | 75 |

DETAILED DESCRIPTION OF INVENTION

Figure 2:
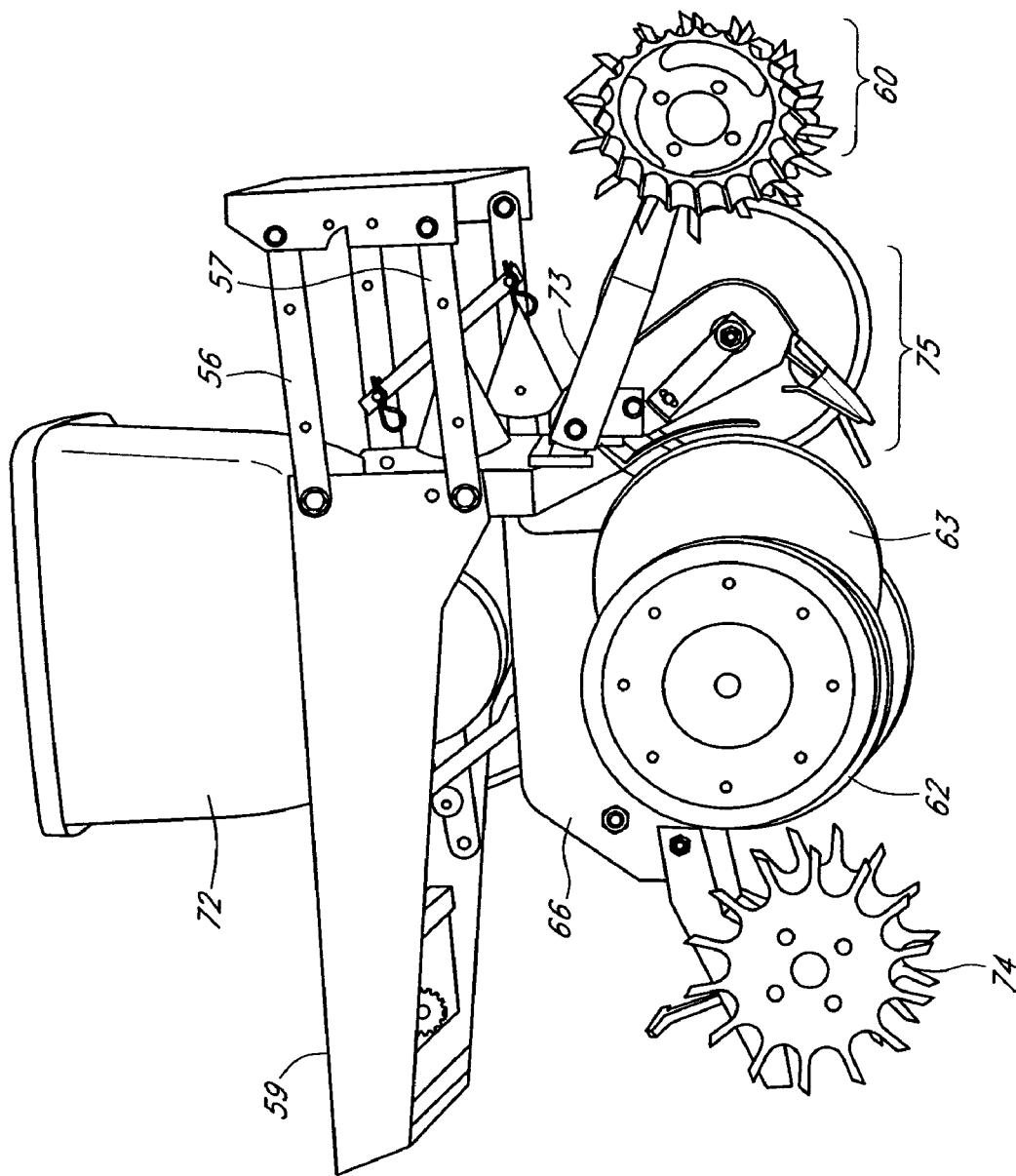
FIG. 2 provides a side view of a planter row unit as found in the prior art with the present invention mounted in combination with a row cleaner.
Figure 3:
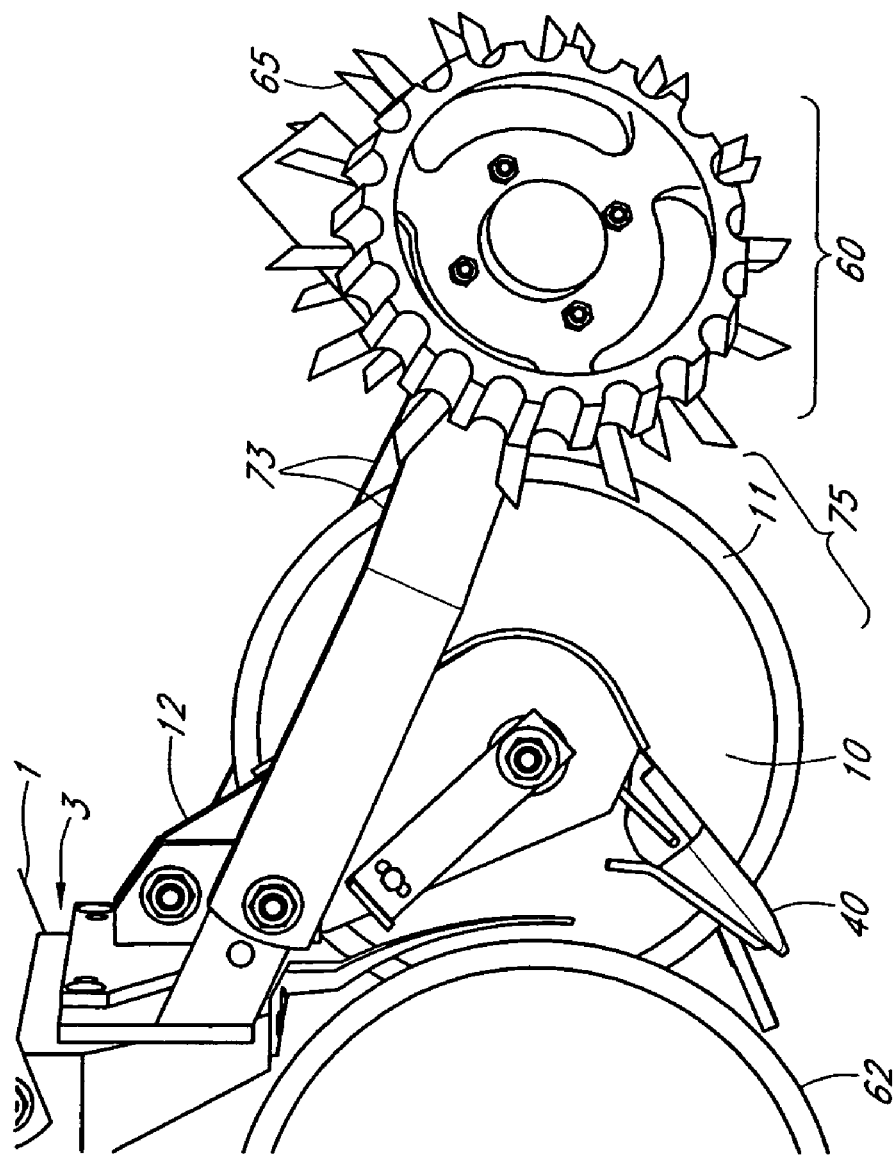
FIG. 3 provides a side perspective view of the planter row unit with the fertilizer disc opener and row cleaner mounted.

Referring now to the drawings, wherein like reference numerals designate identical or corresponding parts throughout the several views, FIGS. 1-3 as presented disclose and describe a typical planter row unit upon which the invention may be mounted wherein the row units 1 are attached to a tool bar or main frame 58 via a parallel linkage 56, 57. FIG. 1 shows the planter row unit 1 is traditionally mounted behind and to the planter mainframe 55 by means of a four bar linkage. This four bar linkage is referred to as a parallel linkage and labeled an upper link 56 and a lower link 57. This configuration allows the planter row unit 1 to flex during operation. The linkage system composed of upper link 56 and lower link 57 connects the center mount of the row unit frame 58 to seed frame hopper 59. Those practiced in the arts will understand that with minor modification the apparatus and method disclosed herein can be also adapted to planter row units 1 mounted to the front of the main planter frame 55. The seed hopper frame 59 and seed hopper 72 are attached to the other end of the parallel linkage. Upper support down pressure spring 68 in combination with air bag 67 and lower arm assembly 69 which is connected to the lower link 57 of the parallel linkage to work together to exert down pressure to keep the planter row unit 1 in the ground during planting. Main drive shaft 70 powers and synchronizes operation of all planter row units mounted to the planter main frame 55. During operation, a furrow for the seed is created by the combined actions of gauge wheels 62 and vee opener blades 63. The seed is deposited in the furrow between the gauge wheels 62 and is metered by a conventional metering unit from a seed storage hopper 72. The furrow is closed by a pair of trailing pinch wheels known as closing wheels 74. (Not shown in FIG. 1) Main drive shaft 70 powers and synchronizes the operation of all of the planter row units mounted to the planter main frame 1 for transmission to and through flexible drive shaft 71 to power each individual planter row unit 1.

FIG. 2 shows the relative mounting of the single disc fertilizer opener 75 to the planter row unit front face plate 3. In FIGS. 2 and 3, the single disc fertilizer opener 75 has been mounted in combination with a row cleaner 60 to row unit face plate 3. For ease of viewing, liquid fertilizer storage tanks and lines have not been included in the enclosed drawings as those practiced in the arts are well versed in storage and supply of liquid fertilizers for incorporated application. As shown in FIG. 3, the compact offset design of the fertilizer disc opener assembly 75 does not interfere with operation of either the row cleaner 60 or the seed vee-opener blades 63 of the planter row unit 1, even when mounted in the mounting area provided by the row unit front face plate 3. This compact but sturdy configuration allows the fertilizer feed shoe 40 to maintain its pre-set spatial distance from the seed furrow created by the vee-openers 63 during operation over various terrains. As shown, the fertilizer feed shoe 40 may be set to deliver liquid fertilizer within one inch of the seed furrow created by vee openers 63.

Figure 4:
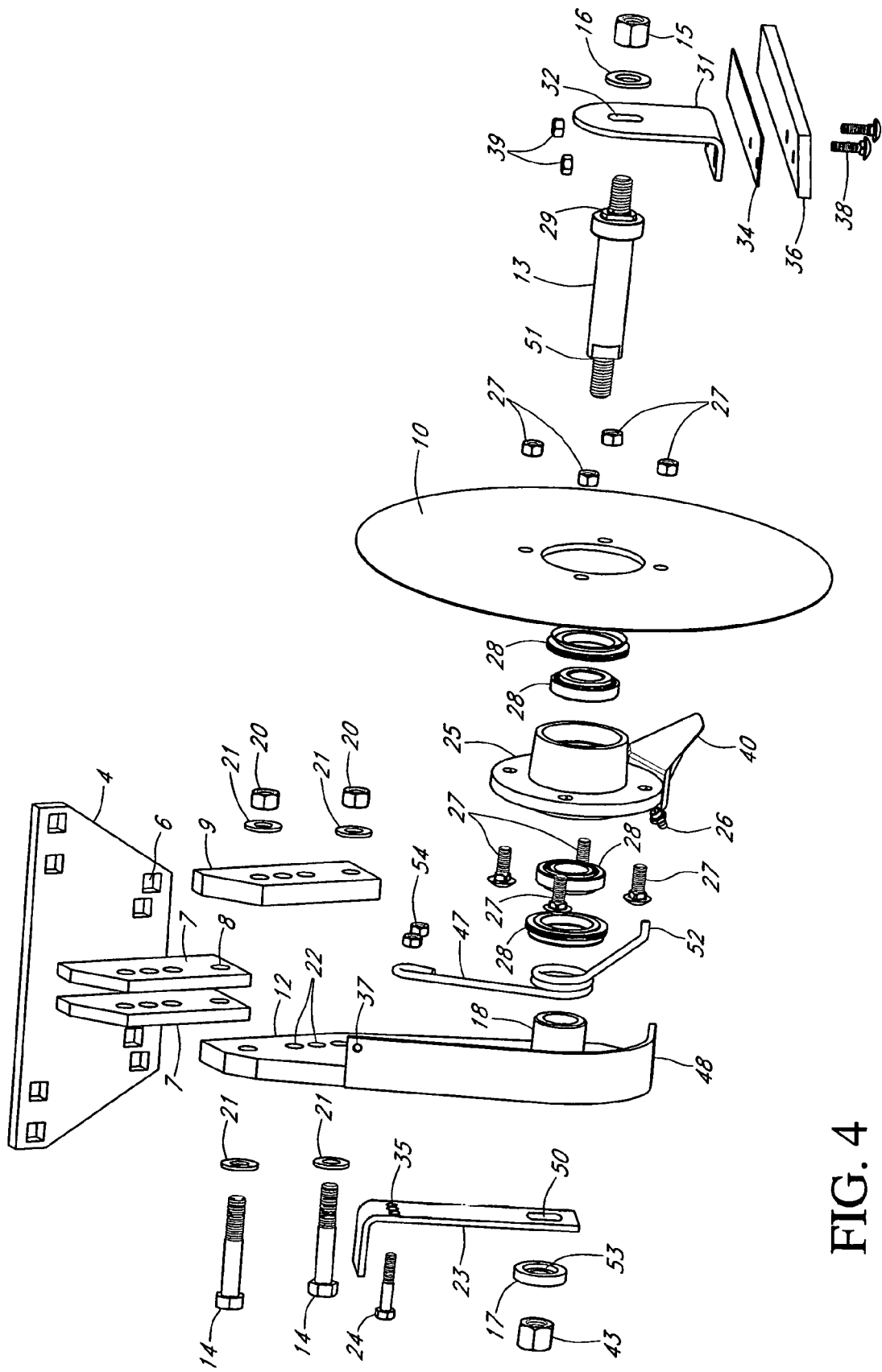
FIG. 4 provides an exploded view of single disc liquid fertilizer opener as shown in FIG. 3 above.

FIG. 4 provides an exploded view of the invention as shown in FIG. 3. This view specifically illustrates another improvement provided herein. Reference is specifically made herein to U.S. Pat. No. 4,796,550 issued to Van Natta et al for a "Single Angled Blade Coulter and Fertilizer Opener." As taught by the Van Natta reference, adjustment to the tapered bearings as required by normal wear and use of the disc assembly 75 would require removal of a tapered cotter pin from a notch in the shaft assembly before the nuts holding the disc assembly in place could be drawn down to pull the shaft through the bearing assembly and thus tighten the disc on the shaft assembly. Because of the difficult conditions that this assembly is subjected to, the removal of a cotter pin from a tapered slot is complicated by wear, rust and impacted dirt. The present art allows for a simple adjustment of the tapered bearings 28 by simply tightening disc axle bearing wear adjustment nut 43. Another advantage of this improved tightening method is that adjustment of the shaft and tapered bearing 28 does not require exposing the internal portions of the tapered bearing. This improved maintenance feature is allowed by using step washer 17 with insert groove 53. Tightening disc axle bearing wear adjustment nut 43 pulls the double-threaded end disc axle 13 through the tapered bearing 28 thereby removing the gap or slack caused by wear in the axle 13 or tapered bearing 28.

The fertilizer feed shoe spring 47 as shown in FIG. 4 when installed is coiled around axle support tube 18. The pre-installation angle between opposing members of the fertilizer feed shoe spring is 105-110 degrees. After installation, the opposing members have an approximate angle of 90 degrees. The top member is fixed to the disc support beam. The other member fits into engagement slot 46 of fertilizer feed shoe 40 at the ninety degree angle defined as the fertilizer feed tube shoe spring anti-rotation end 52. This ninety degree angle locks the fertilizer feed shoe 40 in position. The result of installing the coiled fertilizer feed shoe spring 47 under load and including fertilizer feed tube shoe spring anti-rotation end 52 is to bias the fertilizer feed shoe 40 towards both disc 10 and against the bottom of the furrow during operation.

Figure 5:
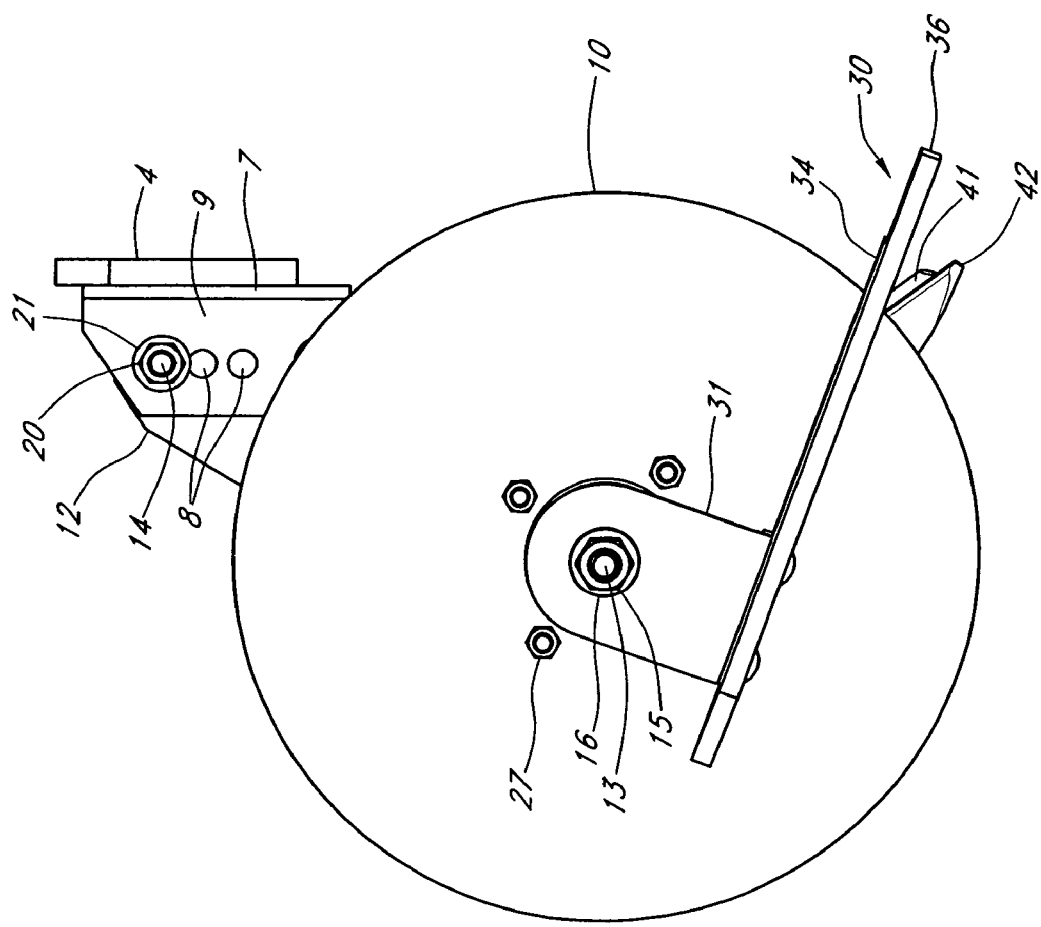
FIG. 5 provides a left side view of a left side row unit fertilizer disc opener.
Figure 6:
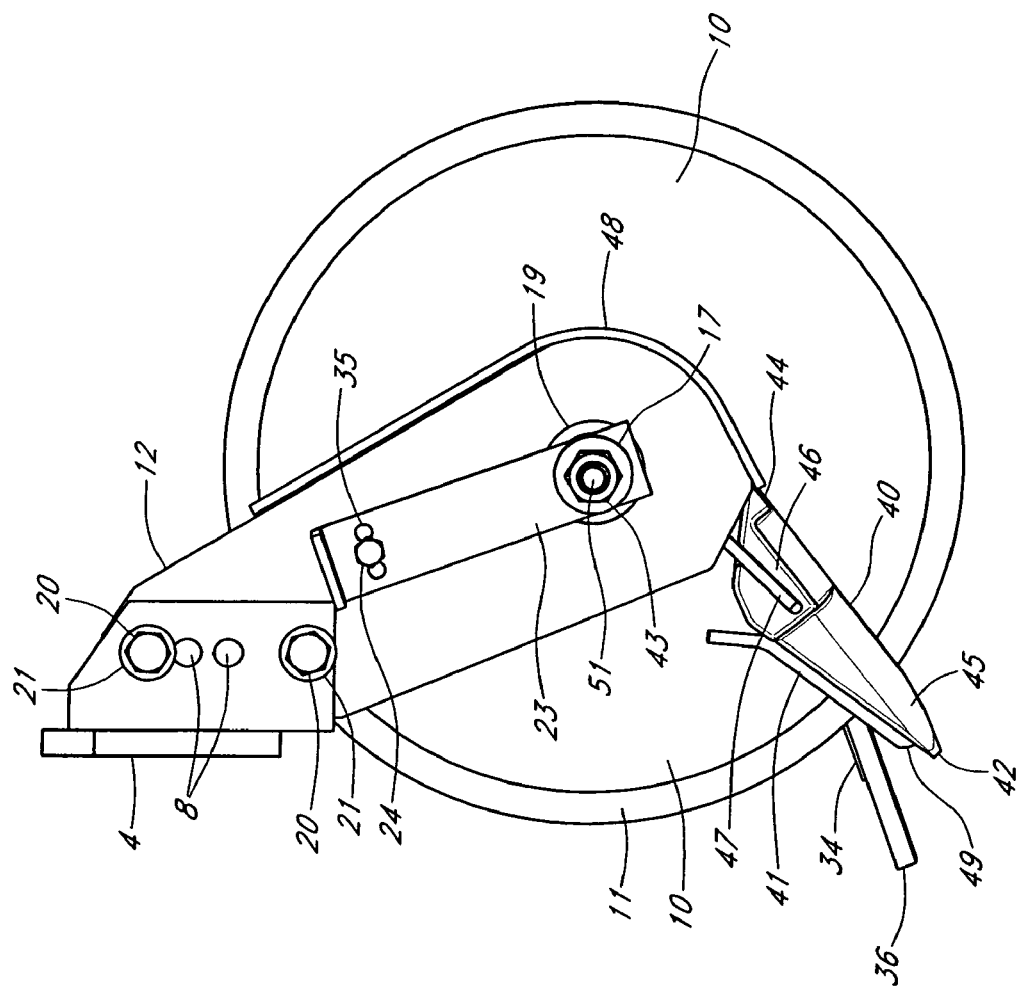
FIG. 6 provides a right side view of a left side row unit fertilizer disc opener.

FIGS. 5-9 illustrate the invention as mounted to the row units found on the left side of a planter. FIGS. 10-14 illustrate the invention as mounted to the row units found on the right side of a planter. FIG. 5 provides a left side view of a left side row unit fertilizer disc opener assembly 75 which is primarily composed of sub-assemblies for angularly mounting the disc 10, the furrow control strap 30 and the fertilizer feed tube shoe 40. Row unit mounting bracket plate 4 is attached to the planter row unit at the row unit front face plate 3 by inserting mounting bracket plate bolts 5 and through mounting bracket bolt holes 6. Disc hub support beam 12 is engaged and attached to mounting bracket support beam side plate 7 by support beam attachment bolts 14 inserted through bracket support beam side plate bolt holes 8, washers 21 and nuts 20 for affixation. The depth of the disc 10 may be adjusted for three depths. When the top bracket support beam side plate bolt holes 8 are engaged, the depth of disc 10 is pre-set to cut a maximum of three-quarter inch above where the seed will be deposited. Selecting the middle bracket support beam side plate bolt holes 8 for securement sets the depth of disc 10 equal to the depth at which the seed will be planted. Selecting the bottom bracket support beam side plate bolt holes 8 for securement sets the depth of disc 10 equal to three-quarter inch below the depth at which the seed will be planted. As illustrated by FIG. 5, furrow strap mounting bracket 31 attaches and aligns the furrow strap 30 to the disc opener assembly 75 through double-threaded end disc axle 13. Furrow strap bracket support nut 15 and washer 16 affixed the position of the furrow strap mounting bracket 31 in relation disc 10. Furrow strap 30 which supports creation of the furrow made by disc 10 is composed of furrow strap stiffener 34 which provides a rigid back to an elastic insert 36 which contacts the soil during operation. Insert 36 may be composed of any number of rubber or plastic materials which allow a combination of wear resistance and flexibility. The combination of stiffener 34 and elastic insert 36 serve to give furrow control strap 30 the necessary resiliency to minimize disruption of the soil as the fertilizer furrow is created by disc 10 for deposition of liquid fertilizer. As illustrated by FIG. 5, fertilizer feed tube 41 is mounted to fertilizer feed tube shoe 40 (not shown) and fertilizer feed shoe soil engagement tip 42 extends past the periphery of disc 10. Similarly, FIG. 10 provides a left side view of a right side row unit fertilizer disc opener assembly 75 which is primarily composed of sub-assemblies for angularly mounting the disc 10, the furrow control strap 30 and the fertilizer feed tube shoe 40. FIG. 6 provides a right side view of a left side row unit fertilizer disc opener assembly 75. Disc 10 is configured to rotate around double-threaded end disc axle 13 (not shown) which is inserted through axle support tube 18 (not shown) and attached to the lower end of substantially vertical disc hub support beam 12. The outside edge of fertilizer feed tube pocket 48 forms a J-shape and when affixed to disc hub support beam 12 by welding, improves the structural strength of the disc assembly 75 while also creating a protective pocket for fertilizer feed tube shoe 40. The bottom front portion of fertilizer feed tube 40 forms fertilizer feed tube shoe cantilever end 44 that pivotably rests against the inside of the lower aft portion of fertilizer feed tube pocket 48. Above the fertilizer feed tube shoe cantilever end 44 is fertilizer feed shoe spring engagement slot 46 for engagement of fertilizer feed shoe spring 47 which is installed under load. By assembling fertilizer feed tube shoe 40 under load, fertilizer feed tube shoe spring 47 is biased against both disc 10 and the bottom of the furrow created by disc 10.

Figure 11:
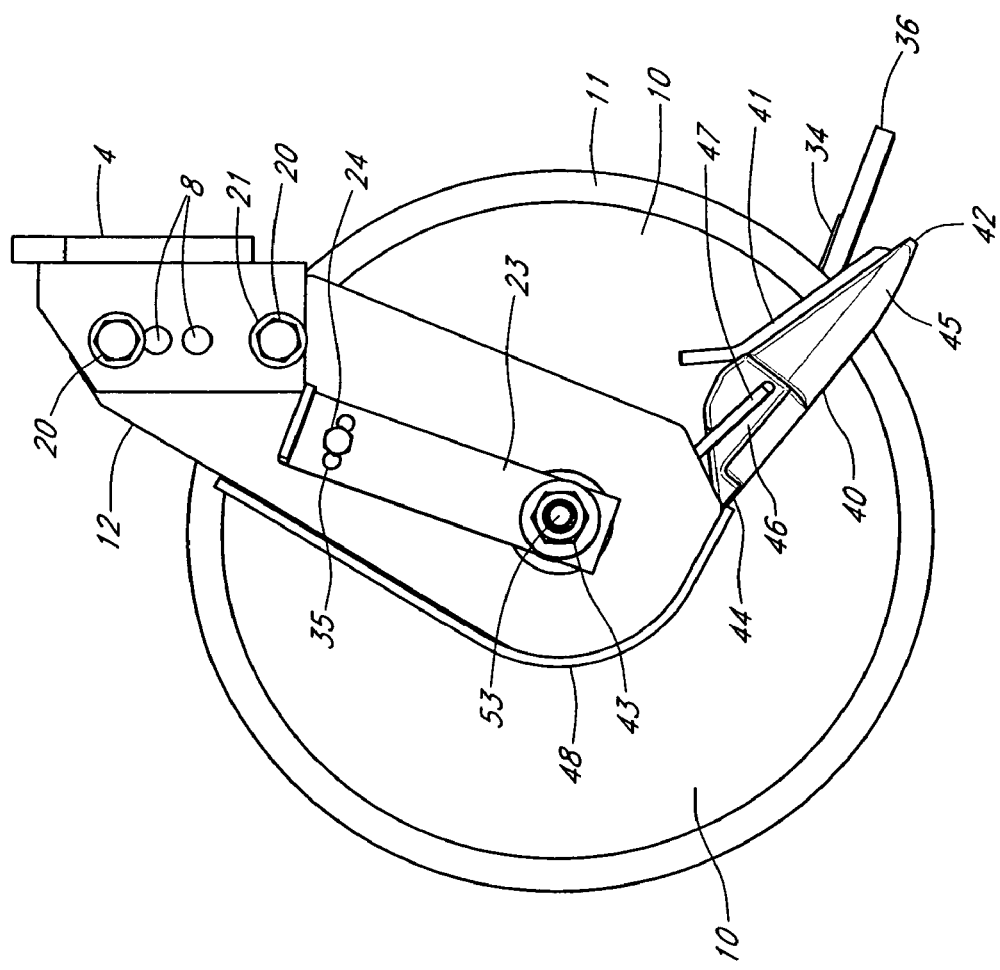
FIG. 11 provides a right side view of the right side row unit fertilizer disc opener.

The disc axle strap depth control keyed and threaded end 51 is inserted through furrow depth control lever 23 and affixed in place by disc axle bearing wear adjustment nut 43. As shown in FIG. 6, fertilizer feed tube 41 is affixed to the top of fertilizer feed tube shoe 40 for discharge of the liquid fertilizer within the furrow created by the disc. Fertilizer feed tube shoe furrow control edge 45 provides a u-shaped fertilizer furrow and keeps the furrow open until the liquid fertilizer is delivered from feed tube discharge end 49 into the bottom of the furrow past the outside periphery of disc 10. Similarly, FIG. 11 provides a right side view of a right side row unit fertilizer disc opener assembly 75 which is primarily composed of sub-assemblies for angularly mounting the disc 10, the furrow strap 30 and the fertilizer feed tube shoe 40.

Figure 7:
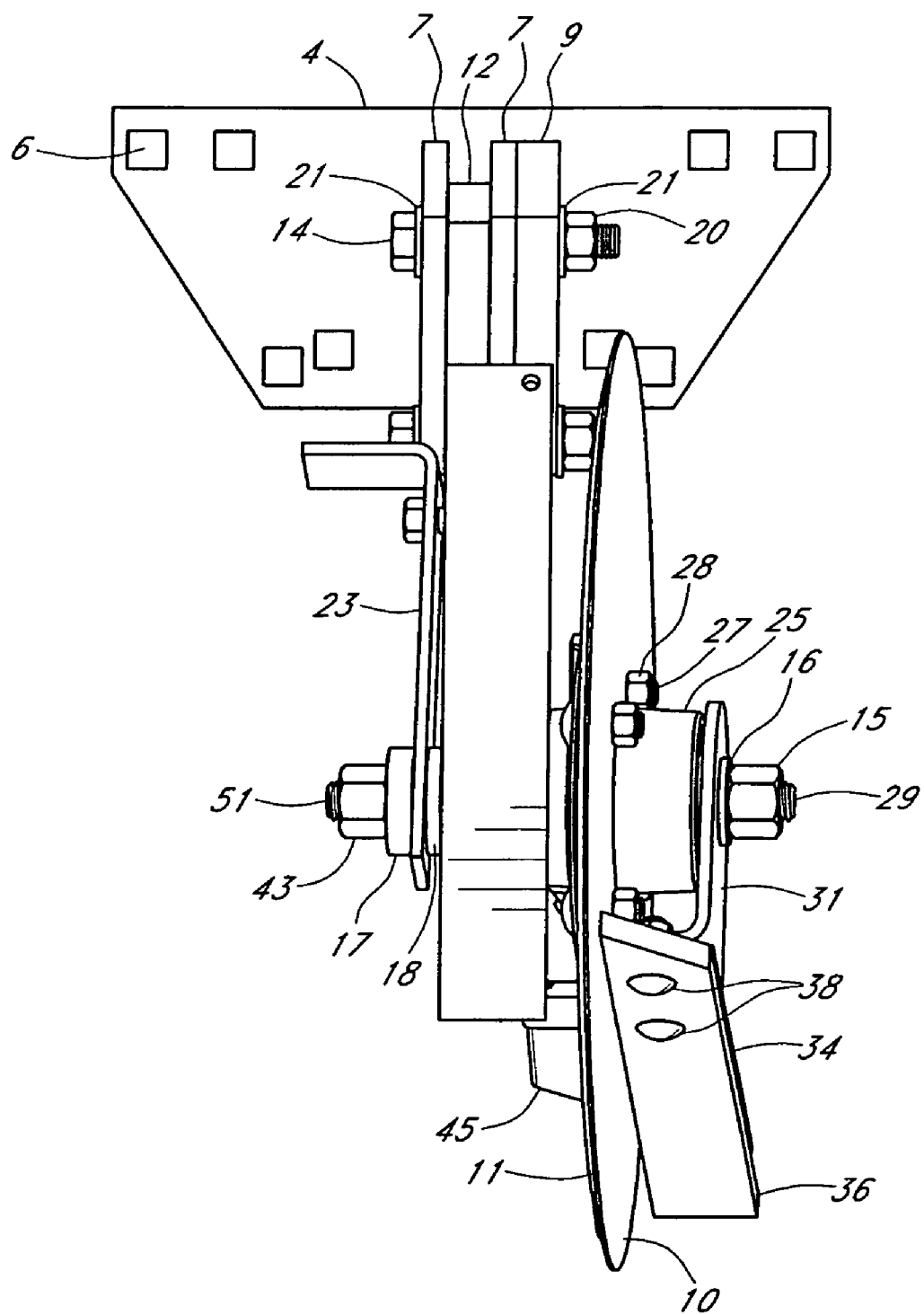
FIG. 7 provides a front perspective view of a left side row unit fertilizer disc opener.
Figure 12:
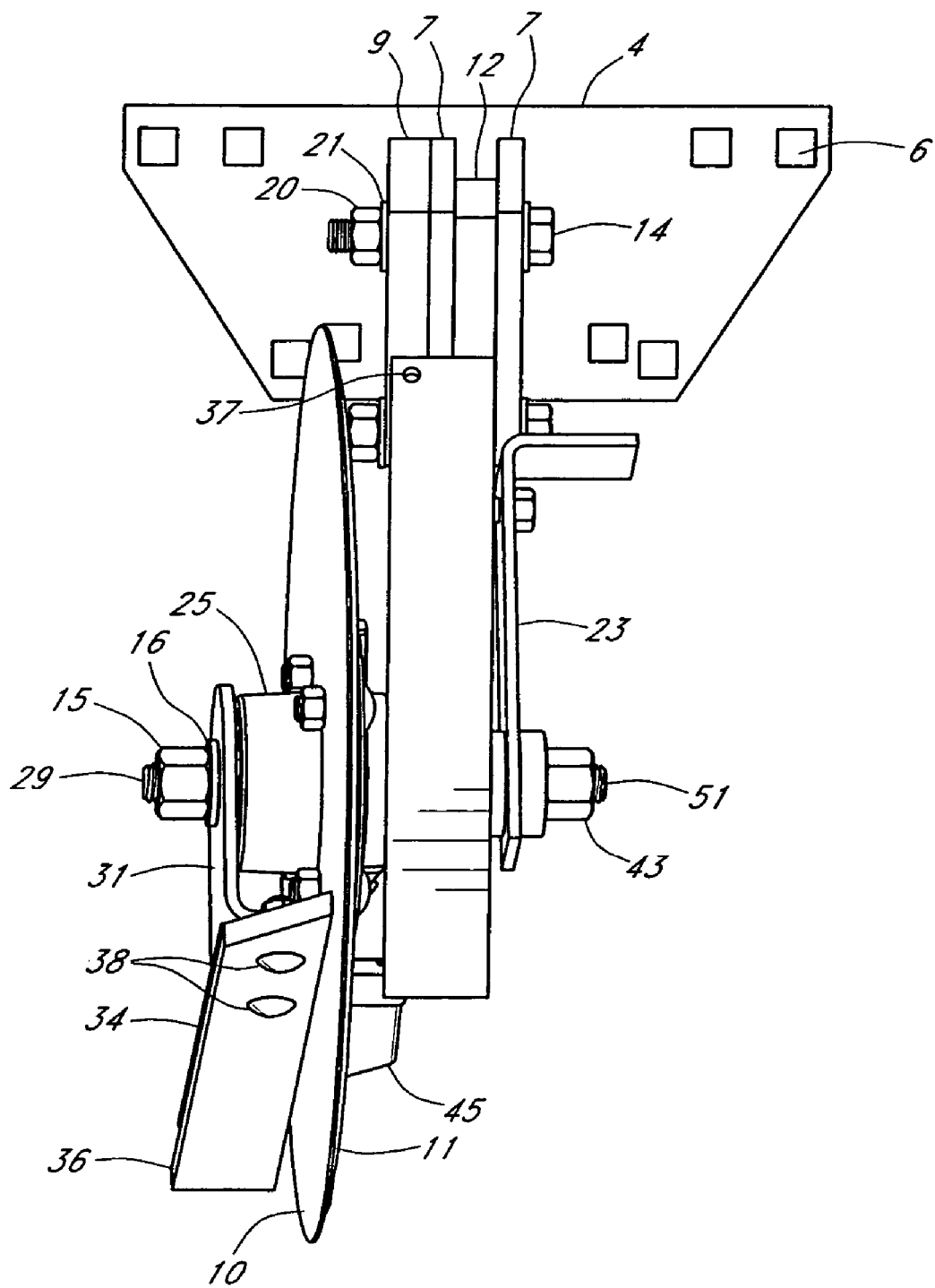
FIG. 12 provides a front perspective view of the right side row unit fertilizer disc opener.

FIG. 7 provides a front perspective view of a left side row unit fertilizer disc opener assembly 75. As shown in FIG. 7, the disc support beam 12 is mounted between both mounting bracket support beam side plates 7. Support beam attachment bolts 14 are inserted through mounting bracket support beam side plate bolt holes 8 and support beam adjustment shim 9 to affix disc hub support beam 12 to the mounting bracket plate 4. The configuration shown in FIG. 7 places the fertilizer two inches from the center of the seed furrow. Placing and securing the disc hub support beam on either side of mounting bracket support beam side plates 7 allows the liquid fertilizer to be placed either one inch or three inches from the center of the seed furrow. Support beam adjustment shim 9 allows the same bolts to be used and fixes the spacing of the components. The disc assembly 75 may also be adjusted to increase or decrease the depth of fertilizer placement. Selection of any two of the mounting bracket support beam side plate bolt holes 8 allows the disc depth to be set equal to the planter row unit vee-opener blades, which places the fertilizer at the same depth as the seed. The fertilizer may also be placed three-quarter inch above or below the depth of the seed. Similarly, FIG. 12 provides a right side view of a right side row unit fertilizer disc opener assembly 75 which is primarily composed of sub-assemblies for angularly mounting the disc 10, the furrow strap 30 and the fertilizer feed tube shoe 40. As shown in FIG. 12, the disc hub support beam 12 is mounted between both mounting bracket support beam side plates 7 but may also be configured for selected offsets from the center of the seed furrow or pre-selected depths.

Figure 8:
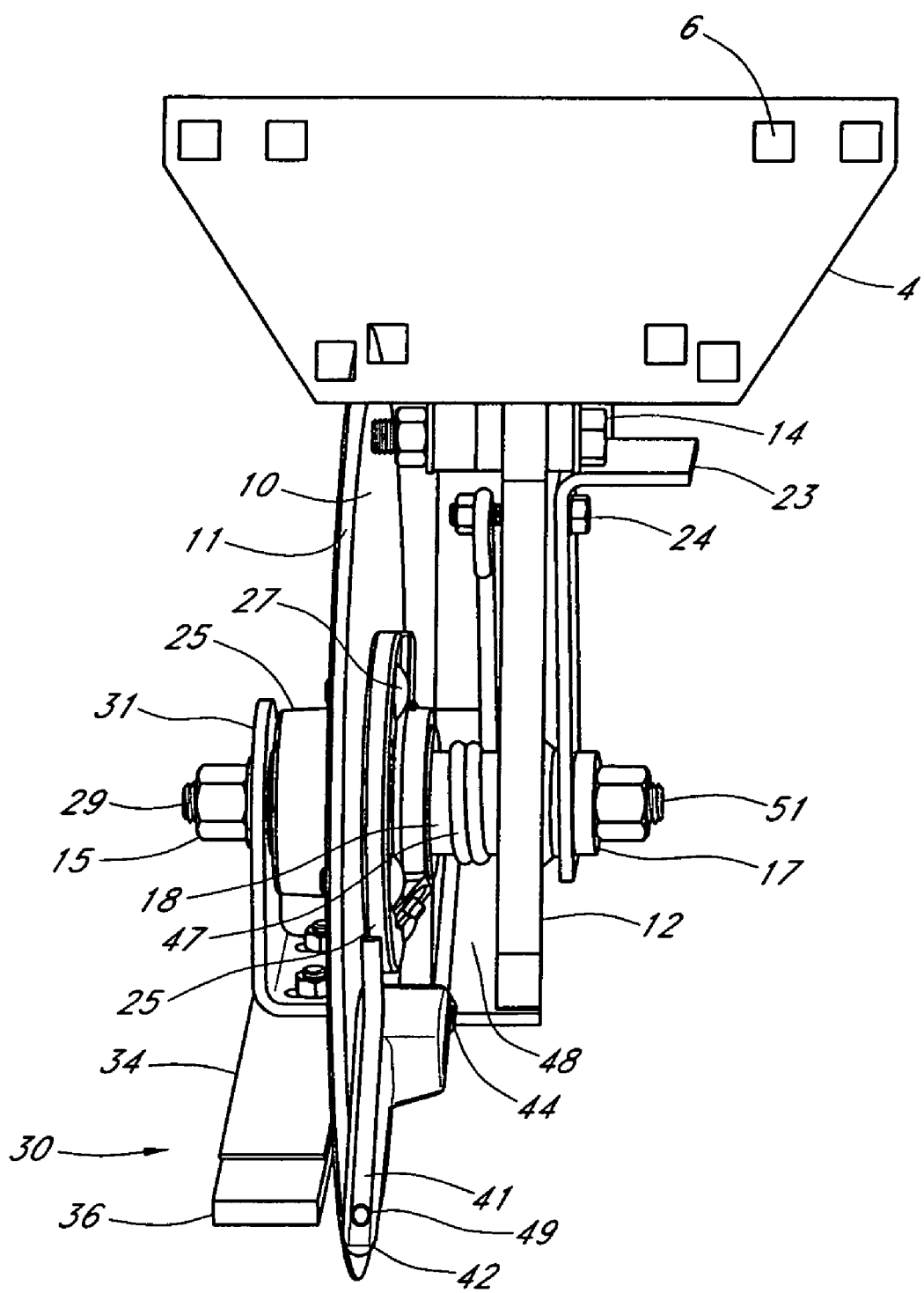
FIG. 8 provides a rear perspective view of a left side row unit fertilizer disc opener.
Figure 13:
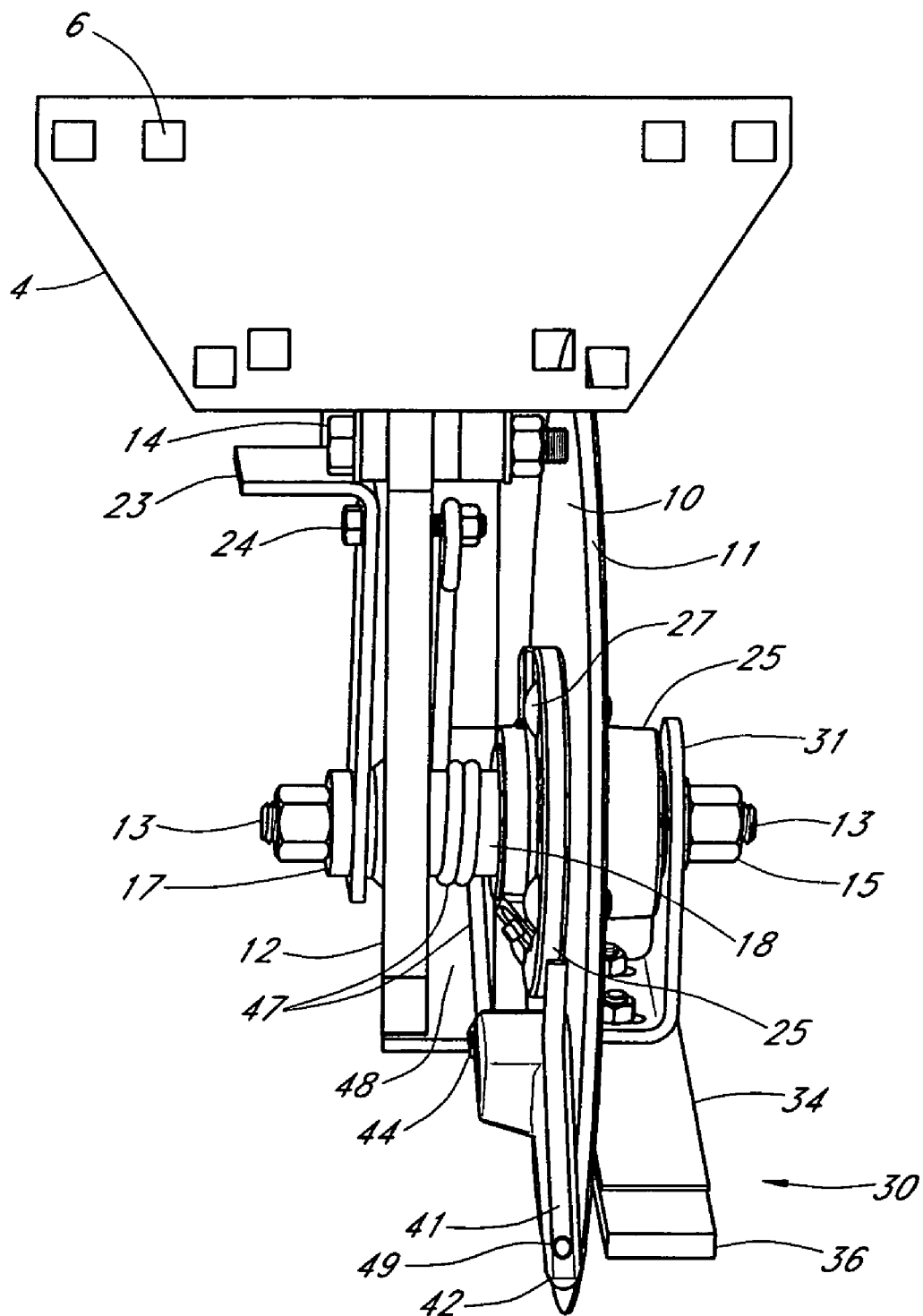
FIG. 13 provides a rear perspective view of the right side row unit fertilizer disc opener.

FIG. 8 provides a rear perspective view of a left side row unit fertilizer disc opener assembly 75. As shown in FIG. 8, disc hub support beam 12 is parallel to the planter row unit 1 direction of travel. Disc axle support tube 18 is mounted to disc hub support beam 12 at a four degree angle by disc axle support tube support weld 19 and double-threaded end disc axle 13 is inserted through disc axle support tube 18. Furrow control strap 30, disc 10 and fertilizer feed shoe 40 are then mounted upon disc axle support tube 18 or double-threaded end disc axle 13 in parallel to each other but at a four degree angle to the planter row unit direction of travel. This configuration ensures accurate placement of the liquid fertilizer both in relation to the fertilizer furrow and the seed furrow during operation. This figure also illustrates the importance of furrow control strap 30 to achieving the objectives of the row unit fertilizer disc opener assembly 75. The furrow control strap 30 mounted against the flat side of the disc 10 serves to minimize build-up on the outside of the disc and aids in minimizing disruption of the soil surrounding the fertilizer furrow. The combination of minimal seed furrow disruption and segregation of the seed and fertilizer furrows provides desired depth and spatial placement of liquid starter fertilizer during planting operations. The position of the furrow control strap 30 may also be adjusted via furrow strap adjustment lever 23 and furrow strap adjustment lever setting bolt 24. Similarly, FIG. 13 provides a right side view of a right side row unit fertilizer disc opener assembly 75 which is primarily composed of sub-assemblies for angularly mounting the disc 10, the furrow control strap 30 and the fertilizer feed tube shoe 40.

Figure 9:
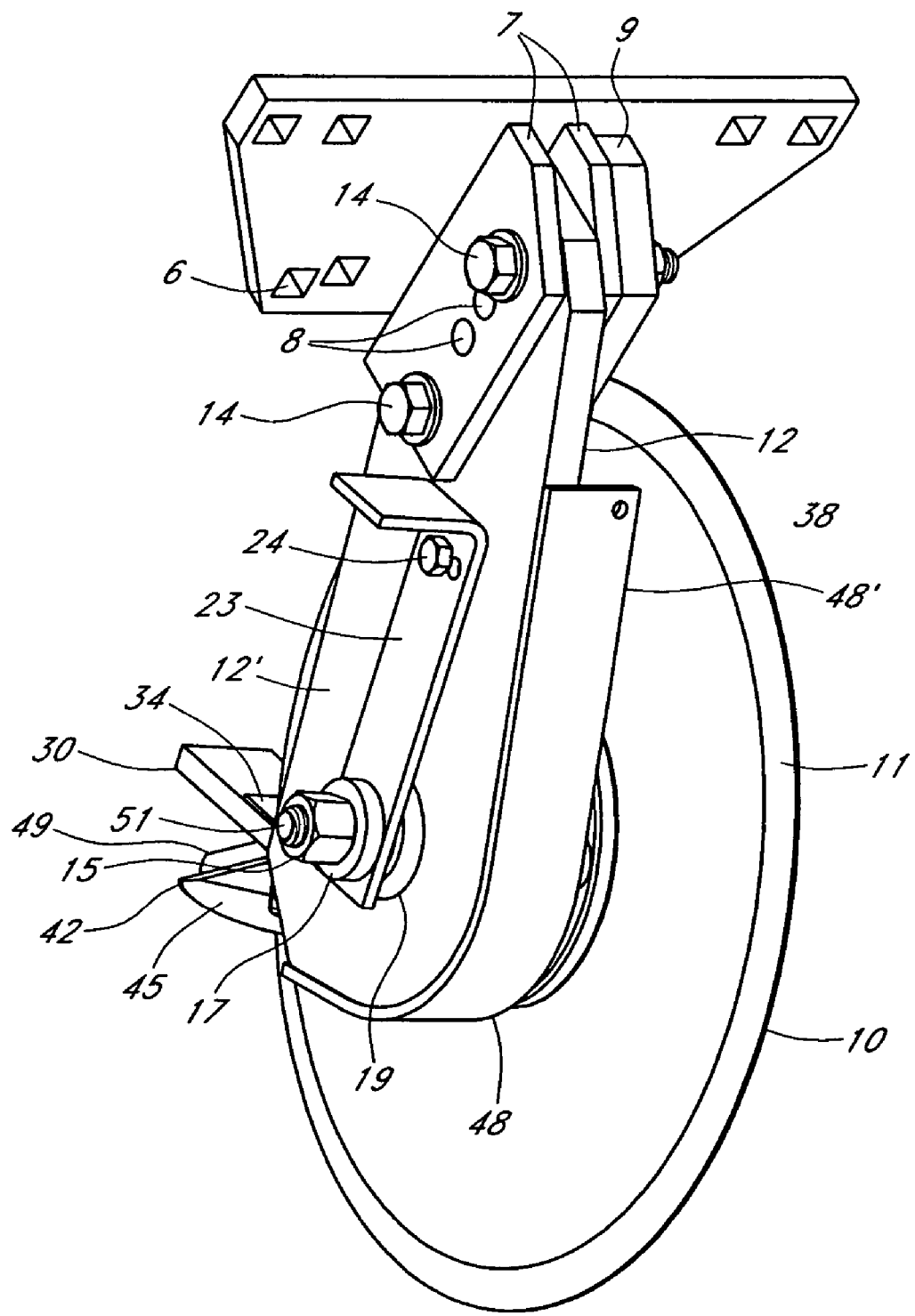
FIG. 9 provides a front perspective view of a left side row unit fertilizer disc opener.
Figure 10:
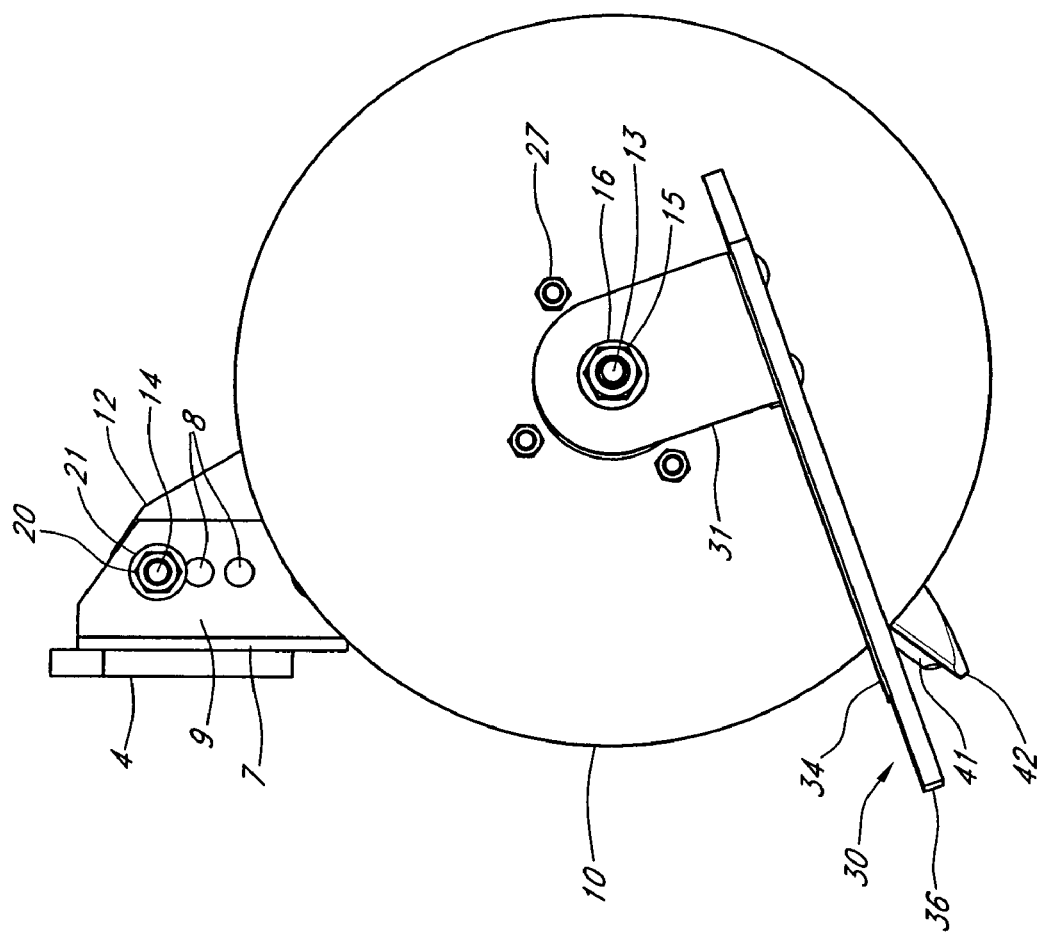
FIG. 10 provides a left side view of the right side row unit fertilizer disc opener.
Figure 14:
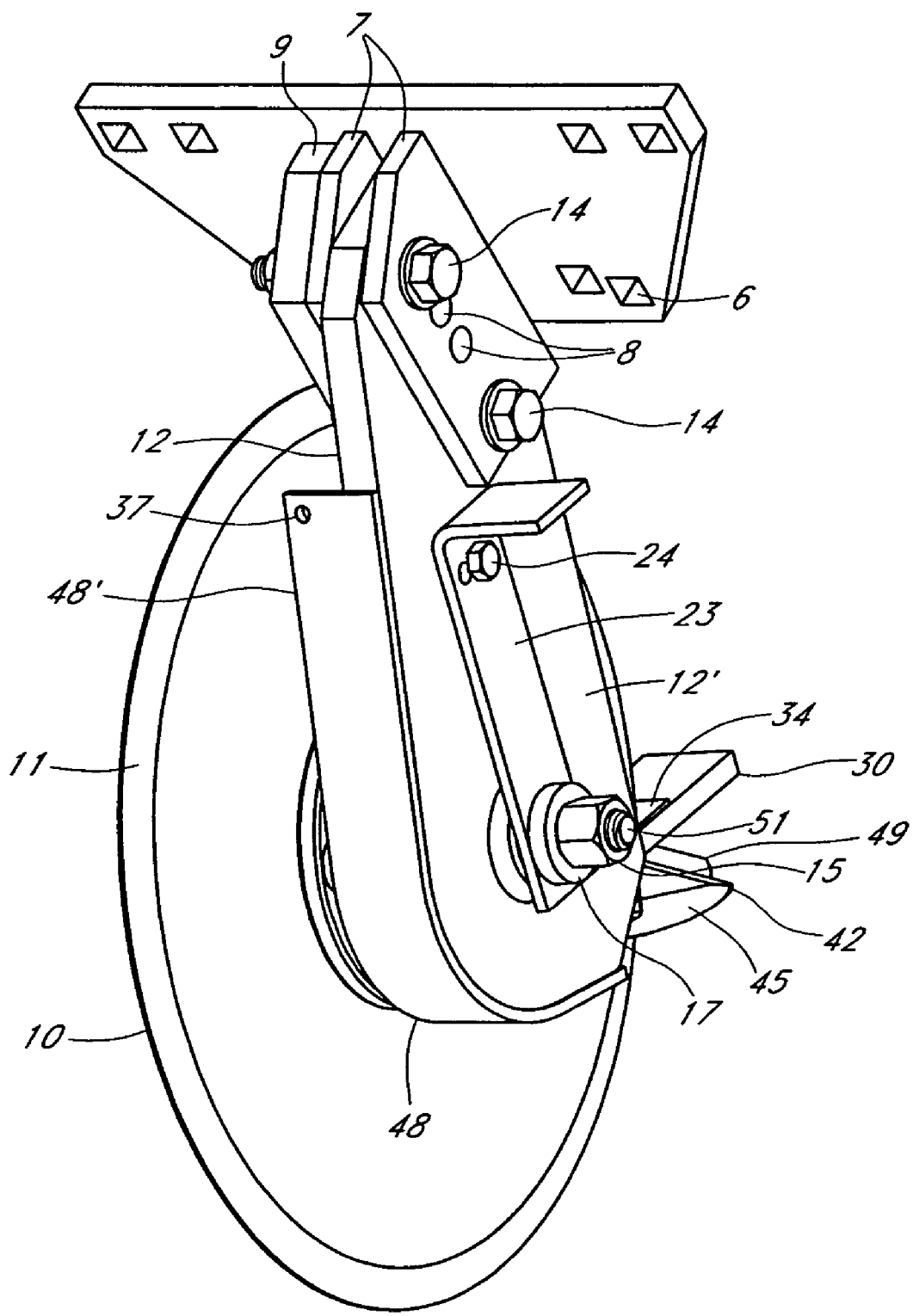
FIG. 14 provides a front perspective view of a right side row unit fertilizer disc opener.
Figure 15:
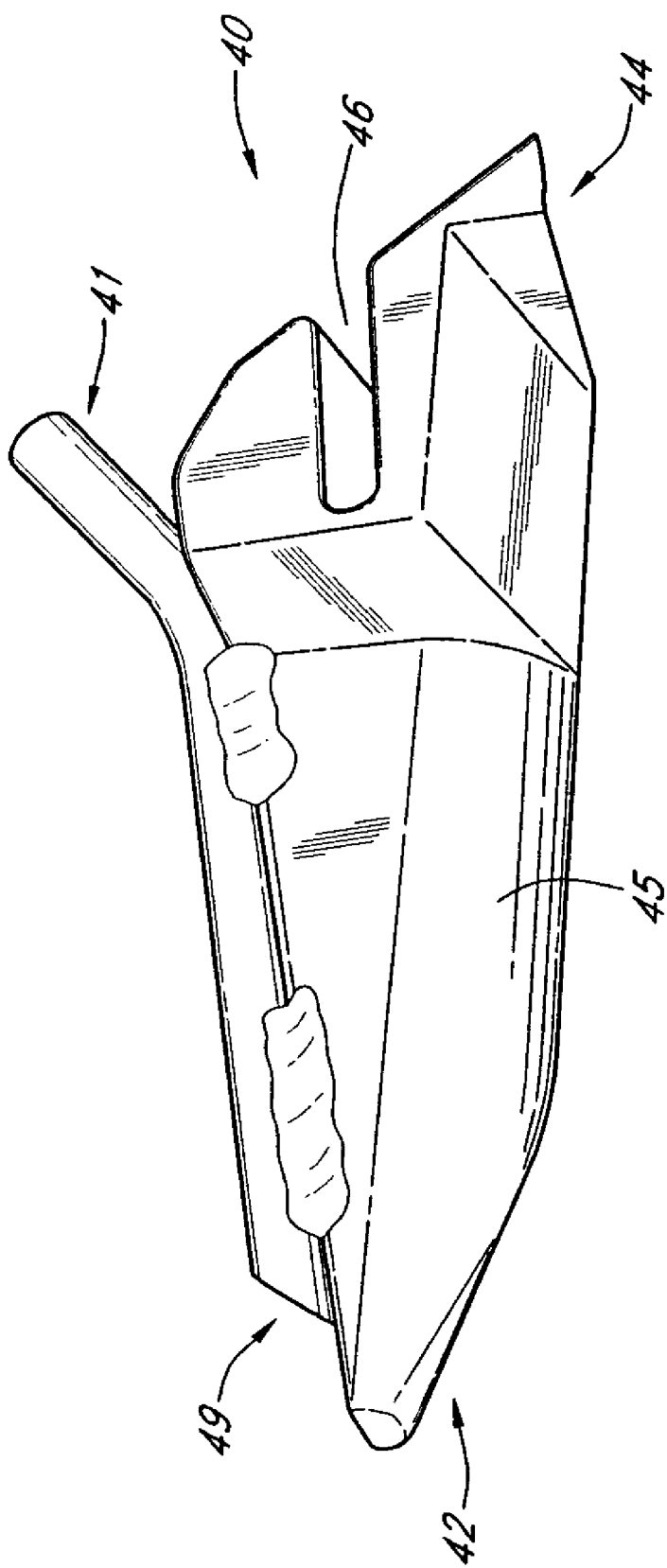
FIG. 15 provides an enhanced view of the fertilizer feed tube shoe.

FIG. 9 provides a front perspective view of a left side row unit fertilizer disc opener assembly 75. FIGS. 8 and 9 also illustrate the beneficial structural features allowed by fertilizer feed tube pocket 48. As shown in FIG. 8, the steel structure of fertilizer feed tube pocket 48 serves as a shield against undesirable materials and reduces contact between the fertilizer feed tube assembly 40 and said materials. The front interior edge of fertilizer feed tube protective pocket 48 is in close proximity to the disc 10 and acts as a scraper. As shown in FIG. 9, the J shape of the front edge of the fertilizer feed tube pocket 48 serves to strengthen the disc hub support beam 12 against side loading forces. Similarly, FIG. 14 provides a front perspective of a right side row unit fertilizer disc opener assembly 75 which is primarily composed of sub-assemblies for angularly mounting the disc 10, the furrow strap 30 and the fertilizer feed tube shoe 40. FIG. 15 better illustrates the fertilizer feed shoe 40. The outer edge of the single disc blade 10 is flat and the inner portion is beveled 11. The beveled edge of the disc 11 cuts a furrow for insertion of the spring loaded fertilizer feed tube shoe 40 within the furrow. The fertilizer feed tube shoe spring 47 is pre-loaded during assembly so that the fertilizer feed tube shoe 40 is biased both to the bottom of the furrow and against the interior of the disc 10. The lower front portion of the fertilizer feed tube shoe 44 rests against the lower aft portion of the fertilizer feed tube pocket 48. This configuration allows the fertilizer feed tube shoe 40 to maintain its substantially horizontal orientation but pivot upward in the event of an over load condition i.e. contact with a stone or clod, thereby preventing catastrophic failure.

The spring loaded fertilizer feed shoe 40 has a generally low profile to minimize soil disruption with a length that is substantially greater than its width and height. In the preferred embodiment, the fertilizer feed shoe 40 is six inches long when paired with a disc 10 having a fourteen inch diameter. The fertilizer feed shoe 40 has both an active inner and outer surface. The inner surface is substantially flat and is biased against the disc 10 to act as a disc scraper. The fertilizer feed tube shoe furrow control edge 45 forms the outer surface of the fertilizer feed tube shoe 40 and has an arcuate surface with a decreasing radius which ends as a straight edge providing the fertilizer feed tube shoe 40 with a knife like edge to engage the lower inside portion of the furrow. The fertilizer feed tube shoe furrow control edge 45 is substantially horizontal during soil engagement. Fertilizer feed shoe soil engagement tip 42 forms the outer portion of the fertilizer feed tube shoe furrow control edge 45 extending past the periphery of the disc 10. The inner portion of the fertilizer feed shoe soil engagement tip 42 facing the disc is substantially flat. The outer portion of the fertilizer feed shoe soil engagement tip 42 also forms a knife like edge having a decreasing arcuate radius along its length and ending as a u-shape at the outer most engagement tip. During operation, the disc 10 and fertilizer feed tube shoe furrow control edge 45 in combination produce a u-shaped furrow having a bottom width substantially equivalent to its top width. The combination of decreasing radii along the fertilizer feed shoe soil engagement tip 42 and fertilizer feed tube shoe furrow control edge 45 hold the furrow created by the disc 10 open and shape the furrow to allow even discharge and distribution of the liquid fertilizer from the fertilizer feed tube discharge end 49 therein at the fertilizer feed shoe soil engagement tip 42 with a minimum of soil disruption.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

The invention claimed is:

1. A row unit mounted opener assembly for depositing liquid fertilizer in a furrow in the ground, the opener assembly comprising:
   a. a mounting means adapted for attachment of said opener assembly to said row unit;
   b. a vertical axle support means for attachment to said mounting means;
   c. a horizontal disc axle support means angularly attached to said vertical axle support means;
   d. a substantially vertical opener disc having first and second sides and leading and trailing edges, said opener disc affixed to a horizontal disc axle engaged upon said angled horizontal disc axle support means; and
   e. a biased furrow engaging means adjacent the second side of said opener disc, said biased furrow engaging means having a liquid fertilizer means for delivery of liquid fertilizer to said furrow, wherein said biased furrow engaging means is biased against said second side of said disc, wherein said furrow engagement means is also biased downwardly towards said furrow, and wherein said furrow engaging means extends to the bottom of said furrow.

2. A row unit mounted opener assembly according to claim 1 wherein the depth of said opener disc may be selectively adjusted by fasteners connecting said vertical axle support means to said mounting means.

3. A row unit mounted opener assembly according to claim 2 wherein the opener disc is affixed to a bearing for engagement with said disc axle.

4. A row unit mounted opener assembly according to claim 3 wherein said bearing is tapered.

5. A row unit mounted opener assembly according to claim 4 wherein a disc axle having threaded ends is inserted through a disc axle support tube.

6. A row unit mounted opener assembly according to claim 5 wherein said opposing disc axle ends are slotted for insertion and locking engagement with ground engaging means attachment frame and adjustment lever.

7. A row unit mounted opener assembly according to claim 6 wherein the depth of said opener disc may be selectively adjusted by fasteners connecting said vertical axle support means to said mounting means.

8. A row unit mounted opener assembly according to claim 7 wherein the fasteners include shims for placement adjacent said mounting means.

9. A row unit mounted opener assembly according to claim 6 wherein the depth of said opener disc may be selectively adjusted by fasteners connecting said vertical axle support means to said mounting means.

10. A row unit mounted opener assembly according to claim 9 wherein said biased furrowing means, disc opener assembly and said ground engaging means are aligned at an angle to the row unit direction of travel.

11. A row unit mounted opener assembly according to claim 6 wherein the depth of said opener disc may be selectively adjusted by fasteners connecting said vertical axle support means to said mounting means.

12. A row unit mounted opener assembly according to claim 11 wherein said lower aft portion of protective fertilizer feed tube pocket provides a mounting surface for cantilevered engagement with the lower frontal portion of said fertilizer feed tube shoe.

13. A row unit mounted opener assembly according to claim 12 wherein said fertilizer feed tube shoe has a flat interior edge for biased contact with said second side of said disc.

14. A row unit mounted opener assembly according to claim 13 wherein said biased fertilizer feed tube shoe has surface a facing away from said disc face with a decreasing radius arcuate surface, said arcuate surface forming a knife like edge to engage the lower inside portion of the fertilizer furrow wherein the tip of the fertilizer feed shoe extends past the periphery of said disc for distribution of the liquid fertilizer from the fertilizer feed tube discharge end.

15. A method of mounting multiple improved row unit mounted opener assemblies as found at claim 14, wherein the side loading forces placed upon the planter mainframe are equalized by having opposing disc opener angles placed on opposite sides of the planter mainframe.

16. A row unit mounted opener assembly according to claim 5 wherein said opposing disc axle ends are slotted for insertion and locking engagement with ground engaging means attachment frame and adjustment lever.

17. A row unit mounted opener assembly according to claim 16 wherein a disc axle end fastener and a grooved washer are adjacently mounted to said disc axle, said disc axle end fastener allowing external adjustment of the internal spatial relationship between said tapered bearing and said disc axle.

18. A row unit mounted opener assembly according to claim 16 wherein a disc axle end fastener and a grooved washer are adjacently mounted to said disc axle, said disc axle end fastener allowing external adjustment of the internal spatial relationship between said tapered bearing and said disc axle.

19. A row unit mounted opener assembly according to claim 18 wherein the depth of said opener disc may be selectively adjusted by fasteners connecting said vertical axle support means to said mounting means.

20. A row unit mounted opener assembly according to claim 19 wherein said opener disc may be selectively positioned by said fasteners connecting said vertical axle support means to said mounting means.

21. A row unit mounted opener assembly according to claim 19 wherein a protective fertilizer feed tube pocket having a frontal edge adjacent to said second side of said opener disc is affixed to said vertical axle support means to strengthen said vertical axle support means and remove debris from the face of second opener disc.

22. A row unit mounted opener assembly according to claim 16 wherein the depth of said opener disc may be selectively adjusted by fasteners connecting said vertical axle support means to said mounting means.

23. A row unit mounted opener assembly according to claim 22 wherein said angle is four degrees.

24. A row unit mounted opener assembly according to claim 16 wherein said opener disc may be selectively positioned by said fasteners connecting said vertical axle support means to said mounting means.

25. A row unit mounted opener assembly according to claim 5 wherein said disc axle end is threadably engaged with a nut having a mylar insert.

26. A row unit mounted opener assembly according to claim 5 wherein said disc axle end is threadably engaged with a nut having a mylar insert.

27. A row unit mounted opener assembly according to claim 26 wherein the depth of said opener disc may be selectively adjusted by fasteners connecting said vertical axle support means to said mounting means.

28. A row unit mounted opener assembly according to claim 27 wherein biased furrowing means further comprises:
   a. a coiled spring having two opposing members, said first opposing member fixed to said vertical axle support means;
   b. a horizontal disc axle support tube, said coiled spring mounted upon said horizontal disc axle support tube; and,
   c. a fertilizer feed tube shoe having a fertilizer feed tube with a discharge end fixed to the upper portion of said fertilizer feed tube shoe, a slot for fixed engagement with said second opposing member and a bottom for biased engagement with said fertilizer furrow.

29. A row unit mounted opener assembly according to claim 26 wherein said opener disc may be selectively positioned by said fasteners connecting said vertical axle support means to said mounting means.

30. A row unit mounted opener assembly according to claim 26 wherein said attachment means for said biased furrowing means, disc opener assembly and said ground engaging means are aligned in the same horizontal plane.

31. A row unit mounted opener assembly according to claim 5 wherein the horizontal position of said opener disc may be selectively adjusted by fasteners connecting said vertical axle support means to said mounting means.

32. A row unit mounted opener assembly according to claim 4 wherein a disc axle end fastener and a grooved washer are adjacently mounted to said disc axle, said disc axle end fastener allowing external adjustment of the internal spatial relationship between said tapered bearing and said disc axle.

33. A row unit mounted opener assembly according to claim 2 wherein the horizontal position of said opener disc may be selectively adjusted by fasteners connecting said vertical axle support means to said mounting means.

* * * * *